United States Patent
Sayama (10) Patent No.: US 10,987,779 B2
(45) Date of Patent: Apr. 27, 2021

(54) HOLLOW SPRING AND MANUFACTURING METHOD THEREOF

(71) Applicant: MITSUBISHI STEEL MFG. CO., LTD., Tokyo (JP)

(72) Inventor: Hironobu Sayama, Ichihara (JP)

(73) Assignee: MITSUBISHI STEEL MFG. CO., LTD.

(*) Notice: Subject to any disclaimer, the term of this patent is extended or adjusted under 35 U.S.C. 154(b) by 0 days.

(21) Appl. No.: 16/616,527

(22) PCT Filed: Jun. 28, 2018

(86) PCT No.: PCT/JP2018/024664
§ 371 (c)(1),
(2) Date: Nov. 25, 2019

(87) PCT Pub. No.: WO2019/004375
PCT Pub. Date: Jan. 3, 2019

(65) Prior Publication Data
US 2020/0094376 A1 Mar. 26, 2020

Related U.S. Application Data

(63) Continuation-in-part of application No. PCT/JP2018/000511, filed on Jan. 11, 2018.

(30) Foreign Application Priority Data

Jun. 28, 2017 (JP) .............................. JP2017-126781

(51) Int. Cl.
*B24C 1/04* (2006.01)
*B24C 3/32* (2006.01)
(Continued)

(52) U.S. Cl.
CPC ................ *B24C 3/327* (2013.01); *B24B 5/40* (2013.01); *B24B 31/006* (2013.01);
(Continued)

(58) Field of Classification Search
CPC ....... B24B 5/40; B24B 31/006; B24B 31/116; B24C 1/04; B24C 1/08; B24C 3/32; B24C 3/325; B24C 3/327
(Continued)

(56) References Cited

U.S. PATENT DOCUMENTS 3,039,234 A * 6/1962 Balman ................. B24B 31/116
451/36
3,634,973 A * 1/1972 McCarty ............... B24B 31/116
451/36
(Continued)

FOREIGN PATENT DOCUMENTS

CN 104395487 3/2015
CN 104707824 6/2015
(Continued)

OTHER PUBLICATIONS

Japanese Office Action for Japanese Patent Application No. 2019-522338 dated Mar. 31, 2020.
(Continued)

*Primary Examiner* — Eileen P Morgan
(74) *Attorney, Agent, or Firm* — Carlson, Gaskey & Olds, P.C.

(57) ABSTRACT

A hollow spring includes a steel tube in which the average of surface roughness is smaller than 10 μm across the entire inner surface of the steel tube and/or compressive residual stress is given to the entire inner surface of the steel tube. The hollow spring may be manufactured by a step of polishing the inner surface of the steel tube by flowing a viscoelastic abrasive medium (200) within the tubular mem-
(Continued)

ber (10), between a first opening (11) and a second opening (12) of the tubular member (10). The abrasive medium (200) may include a viscoelastic base material and a granular abrasive. The inner surface of the steel tube is polished evenly to reduce the surface roughness and/or is given compressive residual stress to increase the fatigue life of the hollow spring.

12 Claims, 10 Drawing Sheets

(51) Int. Cl.
   *B24B 5/40* (2006.01)
   *B24B 31/116* (2006.01)
   *B24C 1/08* (2006.01)
   *B24B 31/00* (2006.01)
   *B24C 11/00* (2006.01)

(52) U.S. Cl.
   CPC .............. *B24B 31/116* (2013.01); *B24C 1/04* (2013.01); *B24C 1/08* (2013.01); *B24C 3/32* (2013.01); *B24C 11/00* (2013.01)

(58) Field of Classification Search
   USPC ..................................................... 451/36, 61
   See application file for complete search history.

(56) References Cited

U.S. PATENT DOCUMENTS

| | | | |
|---|---|---|---|
| 5,070,652 A * | 12/1991 | Rhoades | B24B 31/116 451/104 |
| 5,367,833 A * | 11/1994 | Rhoades | B24B 31/116 451/104 |
| 5,598,735 A * | 2/1997 | Saito | B21D 7/00 72/217 |
| 5,746,691 A * | 5/1998 | Frantzen | A61F 2/91 600/36 |
| 5,788,558 A * | 8/1998 | Klein | B24B 31/116 451/113 |
| 6,418,770 B1 | 7/2002 | Binno | |
| 8,016,642 B2 * | 9/2011 | Kuroiwa | B24C 7/0046 451/38 |
| 9,227,300 B2 * | 1/2016 | Yajima | B24C 1/10 |
| 9,669,516 B2 * | 6/2017 | Lee | B24B 53/017 |
| 10,065,289 B2 * | 9/2018 | Chinnakaruppan | B24B 31/116 |
| 2002/0170177 A1 | 11/2002 | Koyama et al. | |
| 2010/0037976 A1 * | 2/2010 | Toyotake | B21F 3/02 138/177 |
| 2013/0241121 A1 * | 9/2013 | Yajima | F16F 1/00 267/2 |
| 2016/0082565 A1 * | 3/2016 | Kenda | B24B 31/116 451/36 |
| 2017/0108072 A1 | 4/2017 | Takikawa et al. | |
| 2017/0233844 A1 | 8/2017 | Kaneyasu et al. | |
| 2017/0361418 A1 * | 12/2017 | Twelves | B24C 3/325 |
| 2018/0236835 A1 | 8/2018 | Lechner et al. | |

FOREIGN PATENT DOCUMENTS

| | | | |
|---|---|---|---|
| EP | 2647867 A1 * | 10/2013 | F16F 1/00 |
| EP | 2857537 | 4/2015 | |
| JP | S48-002388 | 1/1973 | |
| JP | S60-103643 | 7/1985 | |
| JP | H10281876 | 11/1989 | |
| JP | 6-63613 | 3/1994 | |
| JP | 7-89325 | 4/1995 | |
| JP | 7-215038 | 8/1995 | |
| JP | 7-266216 | 10/1995 | |
| JP | 7-266837 | 10/1995 | |
| JP | 2000-233625 | 8/2000 | |
| JP | 2001-152315 | 6/2001 | |
| JP | 2004-345022 | 12/2004 | |
| JP | 2005059115 | 3/2005 | |
| JP | 2005-271061 | 10/2005 | |
| JP | 2006-35364 | 2/2006 | |
| JP | 2006-68835 | 3/2006 | |
| JP | 2007-125588 | 5/2007 | |
| JP | 2007-127227 | 5/2007 | |
| JP | 2009-125827 | 6/2009 | |
| JP | 2012-117652 | 6/2012 | |
| JP | 2015-120153 | 7/2015 | |
| RU | 2156448 | 9/2000 | |
| RU | 2359805 | 6/2009 | |
| TW | I440727 B | 6/2014 | |
| TW | 201538747 A | 10/2015 | |
| TW | 201736607 A | 10/2017 | |
| WO | 2013-175821 | 1/2016 | |

OTHER PUBLICATIONS

Supplementary European Search Report for European Patent Application 18823224.3 completed Mar. 27, 2020.
Russian Office Action and Search Report for Russian Patent Application No. 2019138566/05(076075) dated Sep. 29, 2020.
Indian Office Action for Indian Patent Application No. 201917049397 dated Oct. 7, 2020.

* cited by examiner

HOLLOW SPRING AND MANUFACTURING METHOD THEREOF

TECHNICAL FIELD

The present invention relates to a hollow spring with the fatigue life improved and a method of manufacturing the same.

BACKGROUND ART

Hollow springs are being examined upon requests for reduction in weight of vehicles, such as automobiles. As a kind of hollow springs, a hollow stabilizer bar produced by bending a steel tube into a predetermined shape is provided to reduce rolling of the vehicle body in cornering, for example. In recent years, the requirements for weight reduction tend to further increase in the light of energy and resource conservation. The demands for hollow stabilizer bars, instead of solid stabilizers, are further increasing (see PTL 1).

In a hollow spring, the stress at the inner surface of the tube is usually lower than at the outer surface. However, when shot peening is performed for the outer surface to give compressive residual stress, the stress at the outer surface is reduced and the difference in stress between the outer and inner surfaces is reduced. As the wall thickness of the hollow spring is reduced for weight reduction, the aforementioned tendency becomes pronounced, sometimes causing a breakage originating from the inner surface.

Since fatigue breakage generally originates from the surface, reducing the roughness of the surface contributes to reduction in stress concentration and allows to improve the fatigue life. For example, a technique is provided which reduces the surface roughness of the inner surface of a pipe material by blasting an abrasive onto the inner surface (PTL 2), for example.

Furthermore, another technique is provided which performs shot peening for the inner surface of a pipe material to give compressive residual stress to the inner surface, thereby increasing the life and durability of the inner surface (PTL 3).

CITATION LIST

Patent Literature

PTL 1: JP H7-89325 A
PTL 2: JP 2012-117652 A
PTL 3: JP 2009-125827 A

Technical Problem

Hollow springs have complex shapes formed by bending. When the wall thickness of a hollow spring is reduced for weight reduction, bent portions are likely to have flattened cross sections. When the inner surface of such a hollow spring is subjected to blasting with an abrasive, the abrasive tends to hit some areas harder than other areas. It is therefore difficult to improve the fatigue life by polishing the inner surface evenly to reduce the surface roughness or by giving compressive residual stress to the inner surface.

In PTL 3, shot peening is performed while a reflection member is moving and making the process complicated. The technique of PLT 3 therefore cannot sufficiently deal with pipe materials of more complex shapes or thinner diameter.

The embodiment is proposed in the light of the aforementioned circumstances. An object of the embodiment is to provide a hollow spring with the fatigue life improved by evenly polishing the inner surface to reduce the surface roughness and/or by giving compressive residual stress to the inner surface and provide a method of manufacturing the same.

Solution to Problem

To solve the aforementioned problem, in a hollow spring according to the application, the average of surface roughness is smaller than 10 µm across the entire inner surface of a steel tube.

Furthermore, another hollow spring according to the application may be a hollow spring composed of a steel tube, in which compressive residual stress is given to the entire inner surface of the steel tube.

A method of manufacturing a hollow spring according to the application includes the steps of: providing a steel tube to be used as a hollow spring; and polishing the inner surface of the steel tube by flowing a viscoelastic abrasive medium within the steel tube, between a first opening and a second opening of the steel tube, in which the surface roughness of the inner surface of the steel tube is thereby reduced and/or compressive residual stress is given to the inner surface of the steel tube to increase the fatigue life of the hollow spring. The steel tube may be bent in a predetermined shape. The steel tube may be heat-treated in advance. The abrasive medium may include a viscoelastic base material and a granular abrasive.

The polishing step may include a step of flowing the abrasive medium from the first opening of the steel tube toward the second opening. The flowing the abrasive medium may further include supplying the abrasive medium from a supply source to the first opening of the steel tube.

The polishing step may include: a first step of flowing the abrasive medium from the first opening of the steel tube toward the second opening; and a second step of flowing the abrasive medium from the second opening toward the first opening. The first step may supply the abrasive medium from the supply source to the first opening of the steel tube and collect the abrasive medium from the second opening of the steel tube to the supply source while the second step supplies the abrasive medium from the supply source to the second opening of the steel tube and collects the abrasive medium from the first opening of the steel tube to the supply source.

A hollow spring according to the application may be manufactured by the aforementioned method.

Effect

According to the present invention, in the hollow spring, the inner surface of the steel tube is evenly polished and/or is given compressive residual stress. The steel tube thereby has a fatigue life improved. Moreover, the inner surface of the hollow spring is polished and/or is given compressive residual stress, and therefore the fatigue life of the hollow spring is increased.

DESCRIPTION OF EMBODIMENTS

Hereinafter, a description is given of a hollow spring according to an embodiment and a method of manufacturing the same in detail with reference to the drawings. The hollow spring of the embodiment is composed of a steel tube. The average of the surface roughness thereof is less than 10 μM across the entire inner surface. The entire inner surface of the steel tube may be given compressive residual stress. This embodiment is described assuming that the hollow spring is a hollow stabilizer bar. However, the embodiment is not limited to the hollow stabilizer bar and is applicable to other kinds of hollow springs, such as hollow coil springs for automobile suspensions, for example. In the hollow stabilizer bar of the embodiment, the body of the hollow stabilizer bar, other than end portions serving the function of connecting to other members, corresponds to the hollow spring.

Figure 1:
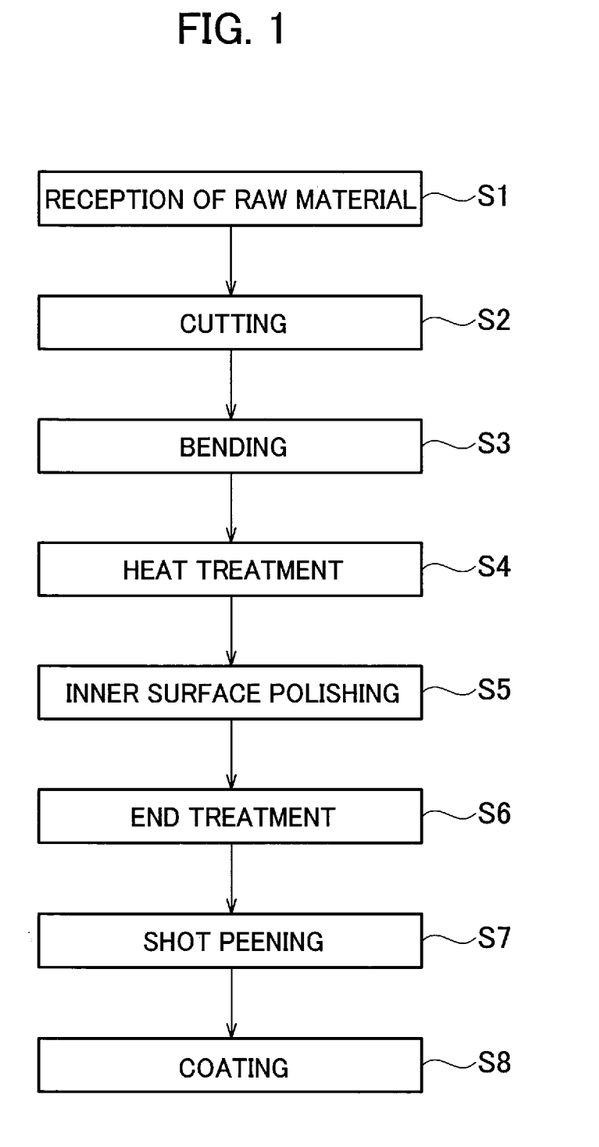
FIG. 1 shows a flowchart illustrating a series of steps to manufacture a hollow stabilizer bar.

As illustrated in the flowchart of FIG. 1, the hollow stabilizer bar according to the embodiment is manufactured by a series of steps of the manufacturing method according to the embodiment including: receiving a steel tube as a raw material (step S1); cutting (step S2); bending (step S3); heat treatment (step S4); inner surface polishing (step S5); end treatment (step S6); shot peening (step S7); and coating (step S8).

The manufacturing method of the embodiment corresponds to the step of inner surface polishing (step S5). In the manufacturing method of the embodiment, a steel tube having been subjected to reception of a raw material (step S1), cutting (step S2), bending (step S3), and heat treatment (step S4) is provided and is subjected to inner surface polishing. In the following description, the steel tube to which the manufacturing method of the embodiment is to be applied after the steps S1 to S4 is referred to as a tubular member for convenience.

The manufacturing method of the embodiment receives the tubular member subjected to heat treatment, such as quenching and tempering, in the step S4 and then performs a process corresponding to inner surface polishing in the step S5 to reduce the surface roughness of the inner surface and/or gives compressive residual stress to the inner surface. In order to reduce surface roughness of the inner surface and/or give compressive residual stress, the tubular member needs to be subjected to the heat treatment in the step S4 before the manufacturing method of the embodiment is applied thereto.

If the order of the manufacturing method of the embodiment and the heat treatment in the step S4 is reversed so that the heat treatment is performed after the inner surface polishing of the manufacturing method of the embodiment, the heat treatment may increase the surface roughness or reduce the compressive residual stress.

As a comparative example, Table 1 illustrates the variation in surface roughness of the inner surface in the case of performing heat treatment for the steel tube after inner surface polishing. Arithmetic average roughness Ra (unit: μm) and maximum roughness Rz (unit: μm) which are measured by a stylus-type measuring device are temporarily reduced from those of the raw material due to the inner surface polishing but are eventually increased due to the heat treatment. Since the heat treatment increases the surface roughness, it is obviously improper that the heat treatment is performed after inner surface polishing. Table 1 shows data measured at the same position of the same steel tube.

TABLE 1

| | | Measurement Phase | | |
|---|---|---|---|---|
| | | Raw Material | After Inner Surface Polishing | After Heat Treatment |
| Surface Roughness (μm) | Ra | 2.565 | 0.775 | 1.93 |
| | Rz | 18.945 | 7.344 | 13.712 |

Figure 2:
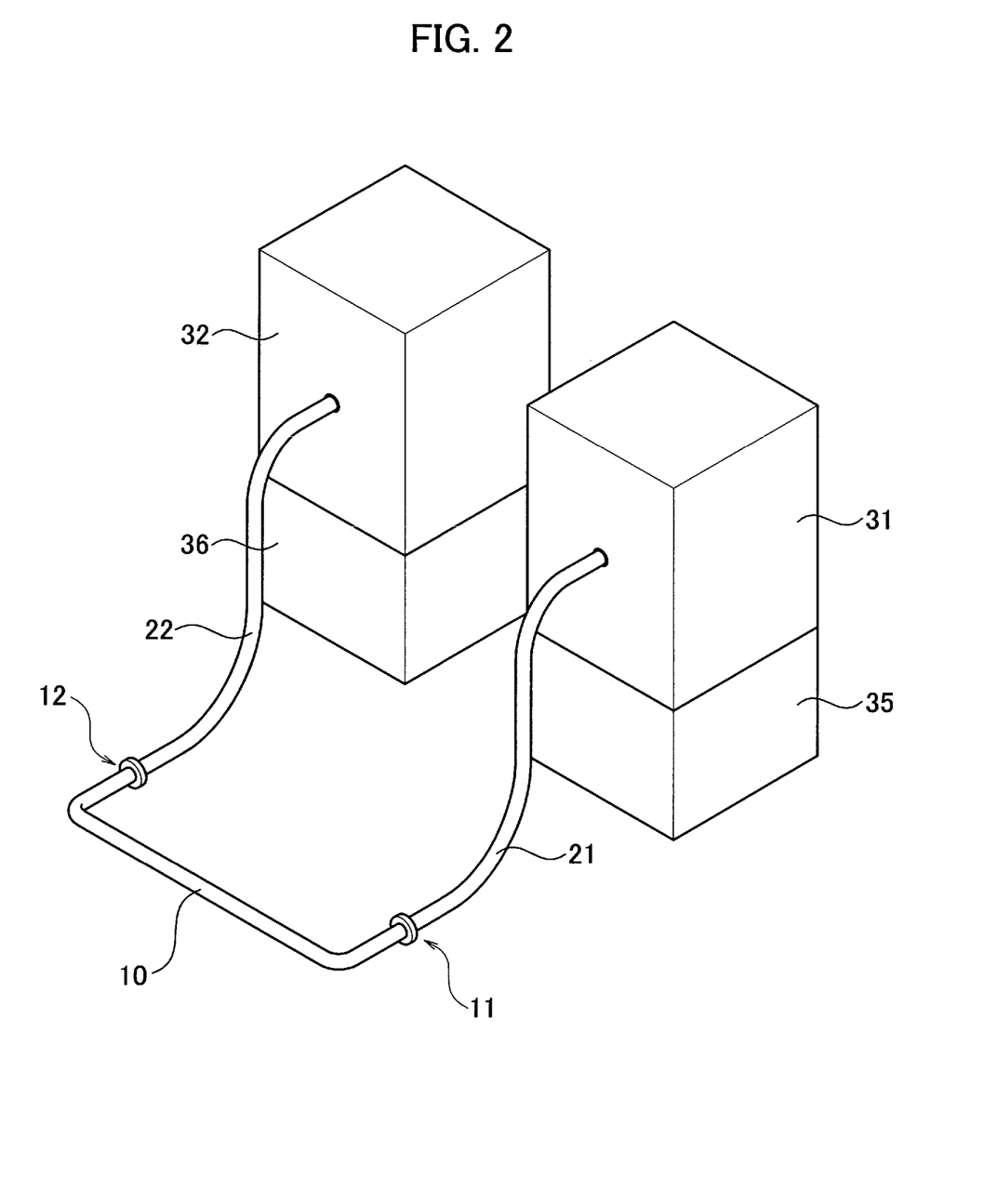
FIG. 2 shows a diagram illustrating an apparatus used to implement a method of manufacturing a hollow stabilizer bar according to the embodiment.

FIG. 2 shows a view illustrating an apparatus used to carry out the method of manufacturing a hollow stabilizer bar. The apparatus illustrated in FIG. 2 supplies an abrasive medium to flow within a tubular member 10 and polish the inner surface thereof. The apparatus includes: a first supply source 31 that supplies the abrasive medium; a first driver 35 that drives the first supply source 31; and a first channel 21 that connects the first supply source 31 and tubular member 10 to feed the abrasive medium. The apparatus further includes: a second supply source 32 that supplies the abrasive medium; a second driver 36 that drives the second supply source; and a second channel 22 that connects the second supply source 32 and tubular member 10 to feed the abrasive medium.

Figure 3:
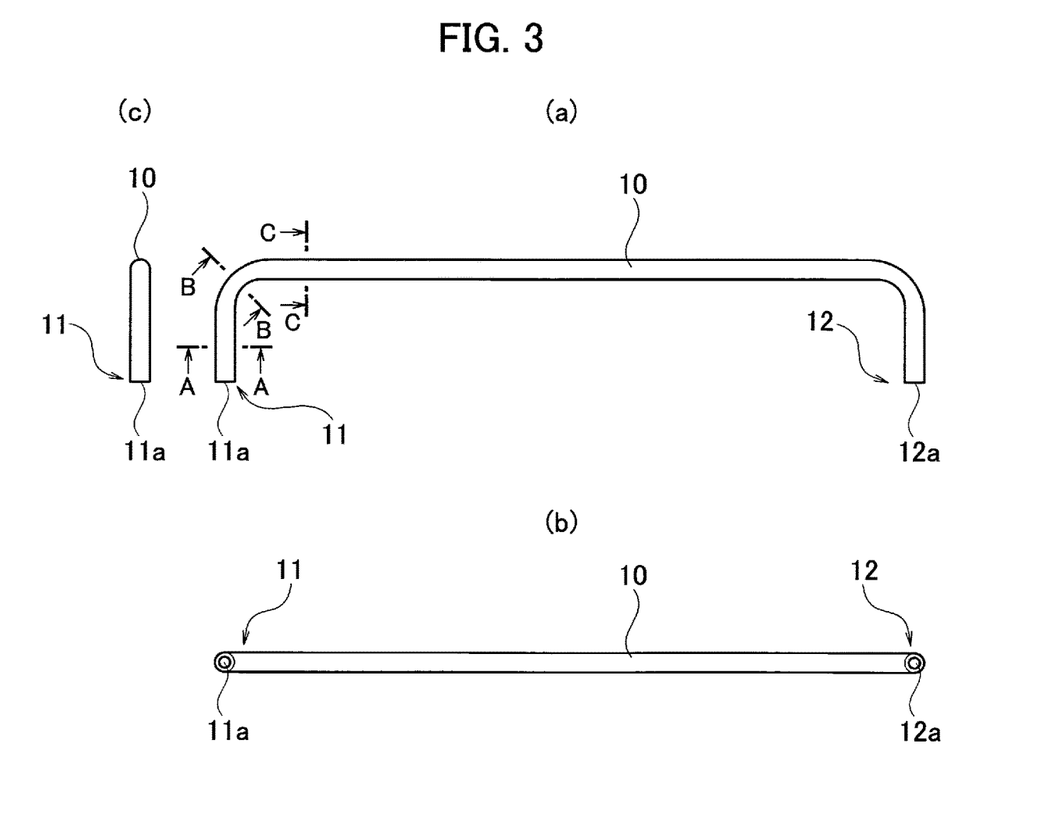
FIG. 3 shows a three-view drawing illustrating a tubular material.

FIG. 3 shows a three-view drawing illustrating the tubular member 10. FIG. 3(a) is the top view thereof, FIG. 3(b) is the front view, and FIG. 3(c) is the side view. The tubular member 10 is formed by bending a steel tube into a U-shape and then performing heat treatment, including quenching and tempering, for the bent steel tube. First and second ends 11 and 12 of the tubular member 10 are open and constitute first and second openings 11a and 12a, respectively.

Figure 4:
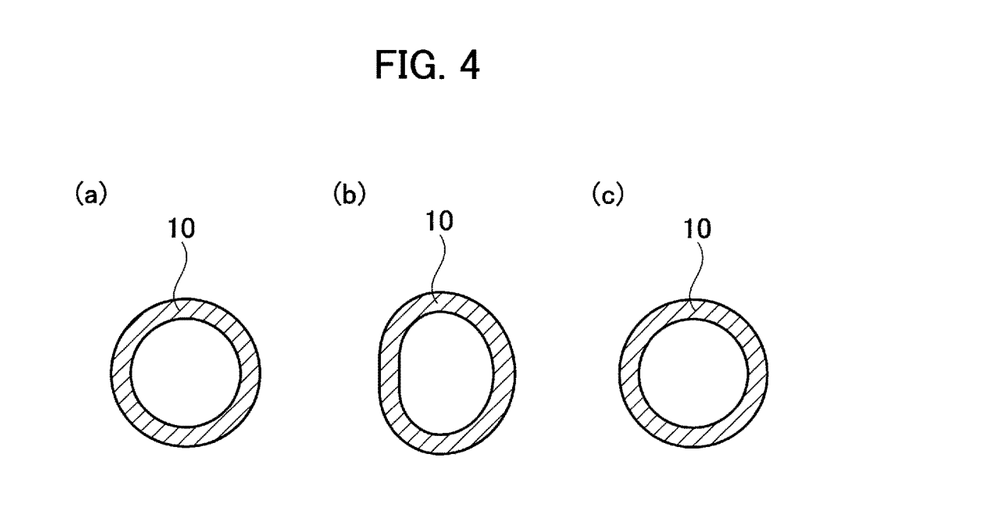
FIG. 4 shows cross-sectional views of a bent portion of a tubular member.

FIG. 4 shows diagrams illustrating the variation in cross-sectional shape of bent portions of the tubular member 10. FIG. 4(a) illustrates the shape of a cross section AA in FIG. 3(a); FIG. 4(b), the shape of a cross section BB; and FIG. 4(c), the shape of a cross section CC. The cross-sectional shape of the tubular member 10 illustrated in FIG. 4(b) is more flattened than that in FIGS. 4(a) and 4(b). When the wall thickness of the tubular member 10 is reduced for weight reduction, the cross-sections of the bent portions have a pronounced tendency of being flattened.

The first and second supply sources 31 and 32 of FIG. 2 supply a viscoelastic abrasive medium to the tubular member 10 through the first and second channels 21 and 22, respectively. The first and second supply sources 31 and 32 collect the abrasive medium from the tubular member 10 through the first and second channels 21 and 22, respectively. While the first supply source 31 supplies the abrasive medium to the tubular member 10 through the first channel 21, the second supply source 32 may collect the abrasive medium through the second channel 22. While the second supply source 32 supplies the abrasive medium to the tubular member 10 through the second channel 22, the first supply source 31 may collect the abrasive medium through the first channel 21.

The abrasive medium contains a granular abrasive (abrasive grains) in a viscoelastic base material and has the property of flowing under high pressure. The base material may be a polymer material, such as polyborosiloxane polymer. The abrasive may be silicon carbide or diamond. The base material and abrasive of the abrasive medium are not limited to those exemplified herein and can be some proper ones.

Figure 5:
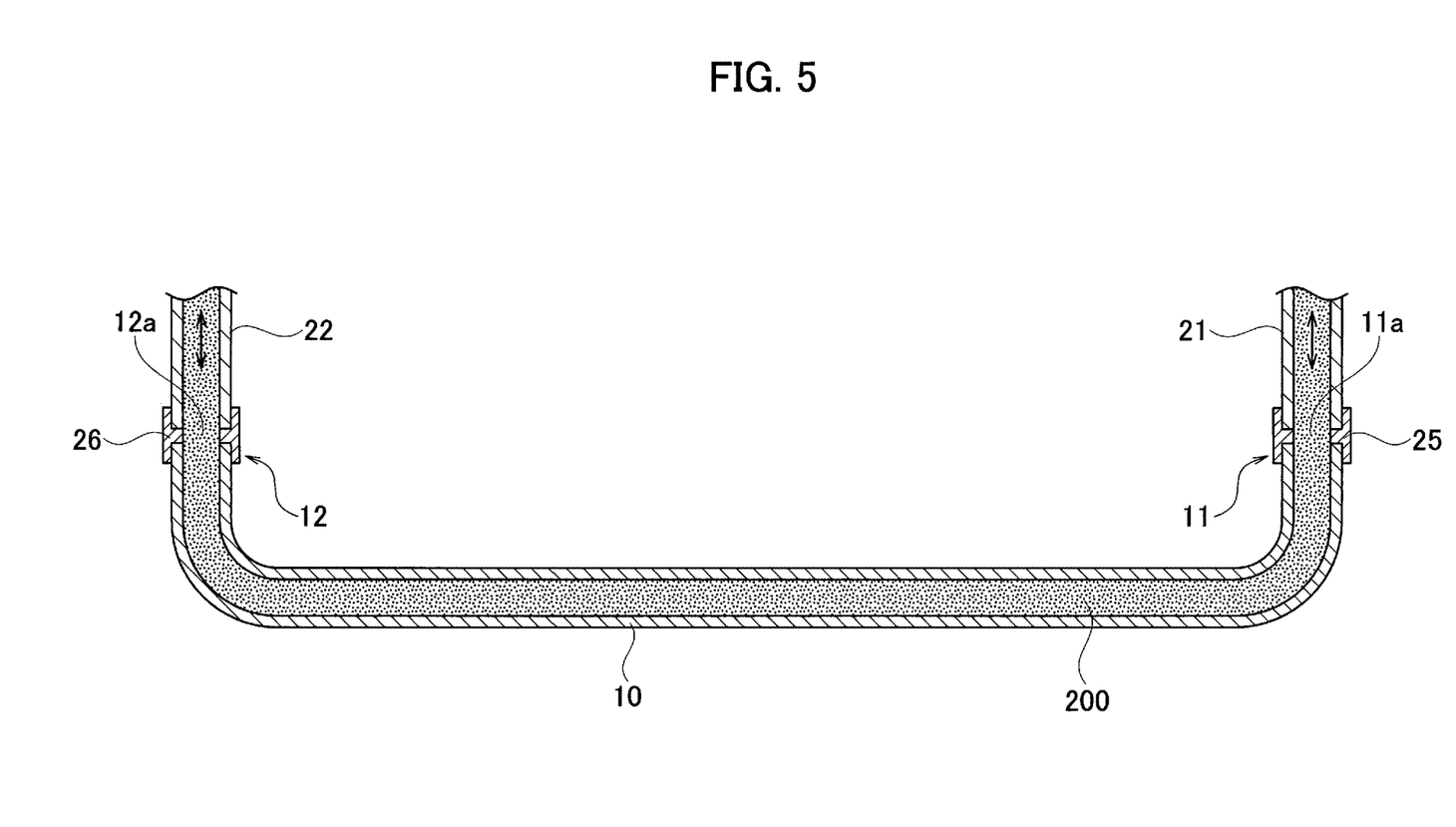
FIG. 5 shows a cross-sectional view for explaining polishing of the inner surface of a tubular member.

FIG. 5 shows a cross-sectional view illustrating polishing of the inner surface of the tubular member 10. The first opening 11a of the first end 11 of the tubular member 10 is connected to the first channel 21 with a first attachment 25. The second opening 12a of the second end 12 of the tubular member 10 is connected to the second channel 22 with a second attachment 26.

In a first process, an abrasive medium 200 is supplied from the first supply source 31 to the first opening 11a of the tubular member 10 through the first channel 21. The abrasive medium 200 supplied to the first opening 11a flows within the tubular member 10 toward the second opening 12a and is discharged from the second opening 12a. The abrasive medium 200 discharged from the second opening 12a is collected to the second supply source 32 through the second channel 22.

In a second process, the abrasive medium 200 is supplied from the second supply source 32 to the second opening 12a of the tubular member 10 through the second channel 22. The abrasive medium 200 supplied to the second opening 12a flows within the tubular member 10 toward the first opening 11a and is discharged from the first opening 11a. The abrasive medium 200 discharged from the first opening 11a is collected to the first supply source 31 through the first channel 21.

The aforementioned first and second processes are alternated, and the abrasive medium 200 reciprocates within the tubular member 10. The abrasive medium 200 contains a granular abrasive (abrasive grains) and flows within the tubular member 10 while polishing the inner surface of the tubular member 10. The inner surface of the tubular member 10 is gradually polished by the abrasive medium flowing within the tubular member 10. Even in the tubular member 10 which is bent in a U-shape as illustrated in FIG. 3 and has a flat cross-section in the bent portions as illustrated in FIG. 4, the inside of the tubular member 10 is polished evenly by the flowing abrasive medium 200. Then, the inner surface of the hollow stabilizer bar is evenly polished to have the surface roughness reduced and/or is given compressive residual stress, and therefore the fatigue life of the hollow stabilizer bar is improved.

In the example illustrated in the embodiment, the first and second processes are alternated, and the abrasive medium 200 reciprocates within the tubular member 10. However, the present invention is not limited to this example. For example, the method of the present invention may include any one of the first process in which the abrasive medium 200 flows from the first opening 11a toward the second opening 12a within the tubular member 10 and the second process in which the abrasive medium 200 flows from the second opening 12a toward the first opening 11a within the tubular member 10.

Furthermore, in the embodiment, the first and second supply sources 31 and 32 are separately provided as illustrated in FIG. 2. The present invention is not limited to this configuration. The first and second openings 11a and 12a of the tubular member 10 are supplied with the abrasive medium from the same supply source through the first and second channels 21 and 22, respectively. The abrasive medium may be supplied or collected by the same supply source so that the abrasive medium reciprocates within the tubular member 10 or the abrasive medium flows in one direction within the tubular member 10, for example.

Example 1

In Example 1, the method of manufacturing a hollow stabilizer bar of the embodiment was applied, and it was confirmed whether the inner surface of the tubular member bent into a U-shape as illustrated in FIG. 3 was polished. In Example 1, measurement was performed for bent portions subjected to bending and intermediate straight portions not subjected to bending.

In Example 1, the abrasive medium contained silicon carbide as the abrasive. The silicon carbide had a grain size equivalent to that of #80 to #100 fixed grinding stones. The abrasive medium was supplied from the supply source of the abrasive medium to the tubular member and flew the same within the tubular member under the conditions of a pressure of 5 MPa, a flow rate of 600 mm/min, and a polishing time of 20 minutes.

Table 2 illustrates the results of measuring the surface roughness of the inner surface with the stylus-type measuring device after the abrasive medium was caused to flow within a tubular member for polishing the inner surface thereof. Table 2 shows arithmetic average roughness Ra (unit: μm) and maximum roughness Rz (unit: μm) in a bent portion and a straight portion. Table 2 also illustrates the results of measuring surface roughness of the inner surface of an unpolished tubular member, in a bent portion and a straight portion under the same conditions, as Comparative Example.

TABLE 2

| | | Measurement Position | | | |
| --- | --- | --- | --- | --- | --- |
| | | Example 1 (Polished) | | Comparative Example (Unpolished) | |
| | | Bent Portion | Straight Portion | Bent Portion | Straight Portion |
| Surface Roughness (μm) | Ra | 0.513 | 0.497 | 2.031 | 1.895 |
| | Rz | 3.637 | 3.770 | 14.673 | 14.036 |

Figure 6:
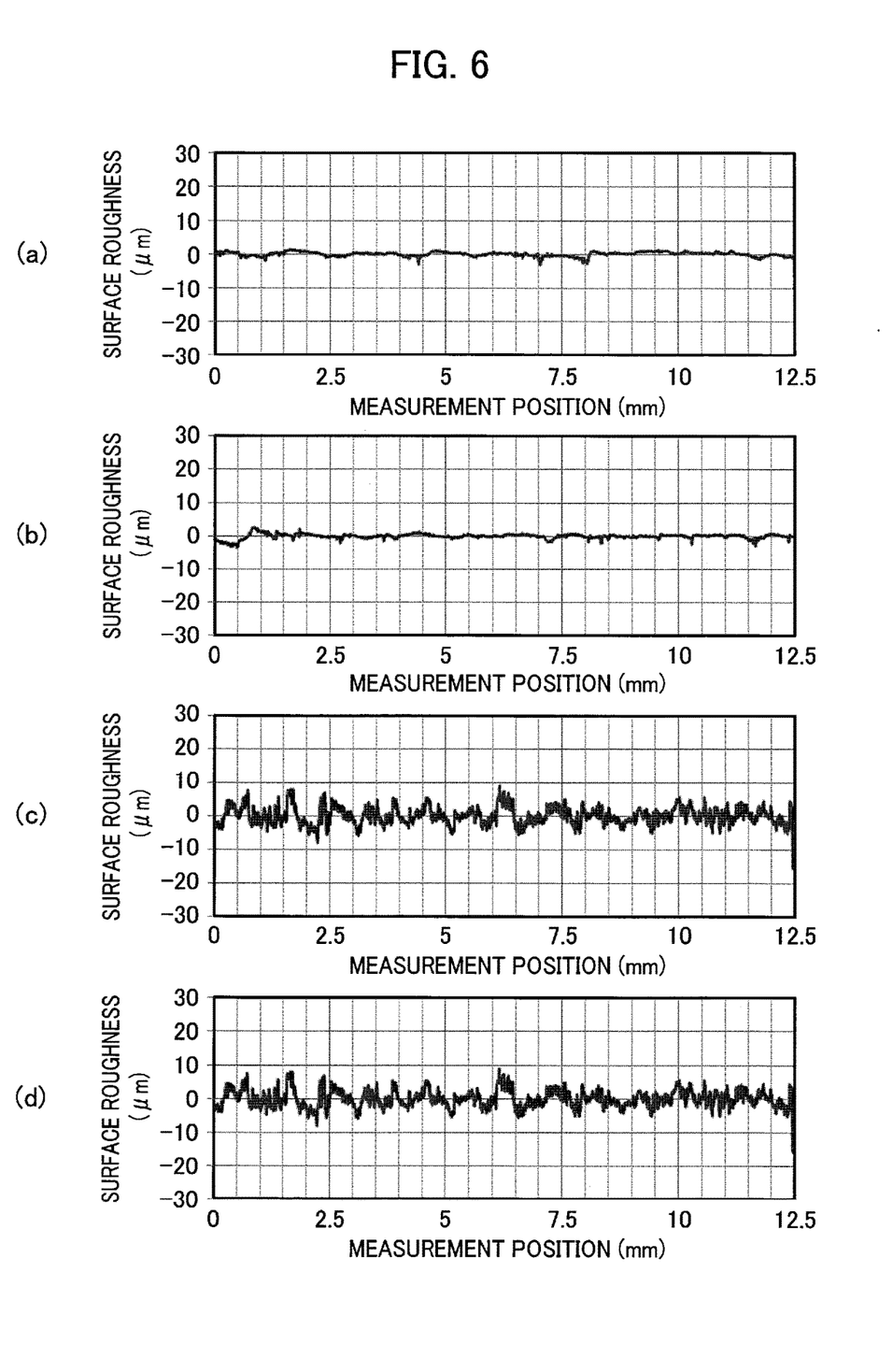
FIG. 6 shows graphs illustrating surface roughness waveforms of Example 1.

FIG. 6 illustrates the results of measuring roughness waveform data of Example 1. FIG. 6(a) illustrates the roughness waveform of the bent portion of Example 1. FIG. 6(b) illustrates the roughness waveform of the straight portion of Example 1. FIG. 6(c) illustrates the roughness waveform of the bent portion of Comparative Example. FIG. 6(d) illustrates the roughness waveform of the straight portion of Comparative Example.

Table 2 and FIG. 6 show that the surface roughness of either the bent or straight portion in Example 1 was smaller than those of Comparative Example. Example 1 therefore reveals that the method of manufacturing a hollow stabilizer bar according to the embodiment can sufficiently reduce the surface roughness within the tubular member, in either the bent or straight portion.

Figure 7:
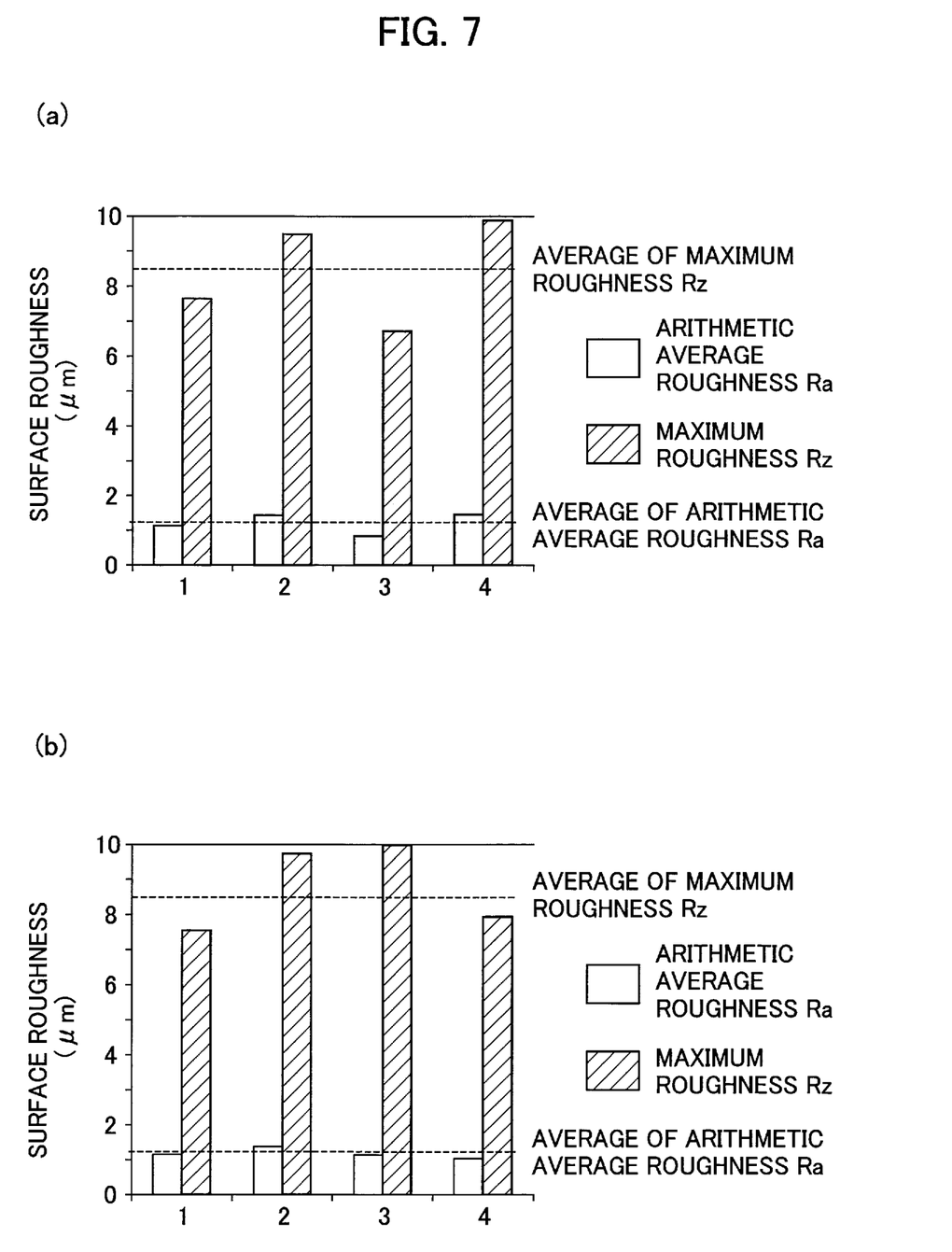
FIG. 7 shows graphs illustrating the results of measuring the surface roughness of the inner surface in a bent portion and a straight portion of the tubular member.

FIG. 7 illustrates graphs of the results of measuring the surface roughness at four points randomly located in the circumferential direction of the inner surface, in the bent and straight portions of the tubular member of Example 1. FIG. 7(a) shows the arithmetic average roughness Ra and maximum roughness Rz in the bent portion of the tubular member on the vertical axis for each point on the horizontal axis, from the first to fourth points. The diagram includes the averages of the arithmetic average roughness Ra and maximum roughness Rz together. FIG. 7(b) shows roughness in the straight portion of the tubular member in a similar manner.

As shown in FIG. 7, the numeral values of the arithmetic average roughness Ra and maximum roughness Rz at the four points were comparatively close to the averages of the four points, in both the bent portion (FIG. 7(a)) and the straight portion (FIG. 7(b)). This reveals that according to the method of manufacturing a hollow stabilizer bar of the embodiment, the inner surface is polished so that the surface roughness is constant regardless of circumferential position, in the bent and straight portions.

Figure 8:
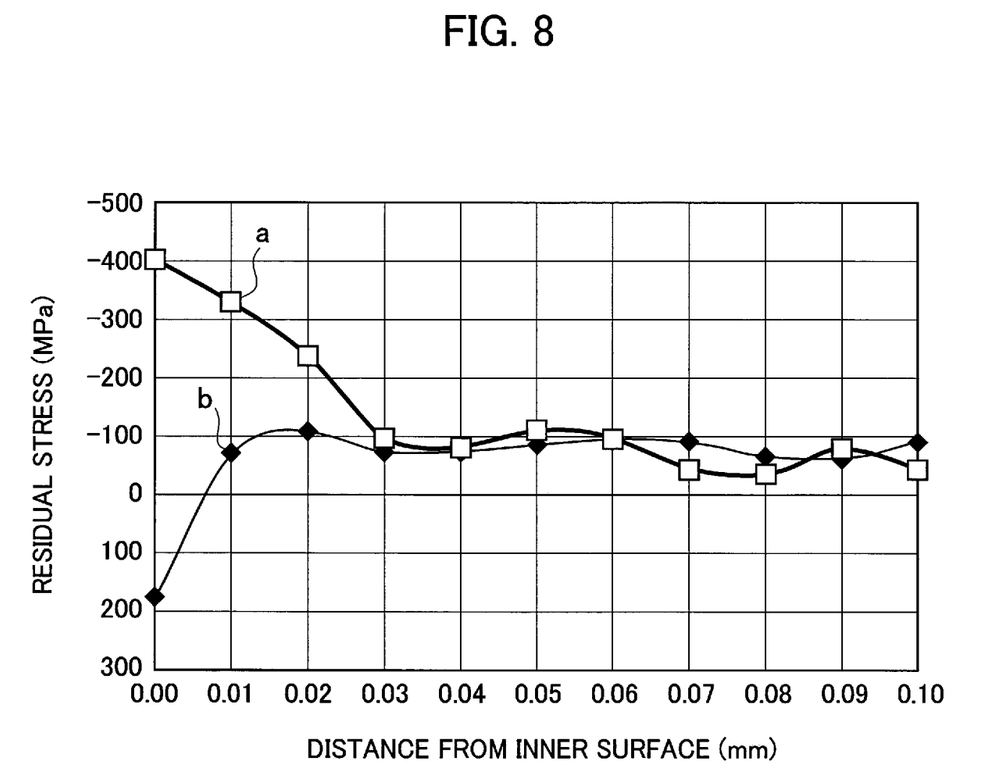
FIG. 8 shows a graph illustrating the results of measuring residual stress in the inner surface of the tubular member of Example 1.

FIG. 8 shows a graph illustrating the results of measuring residual stress at the inner surface of the straight portion of the tubular member 10. The residual stress was measured with respect to the distance from the inner surface of the tubular member 10 in the depth direction using an X-ray stress measuring apparatus. Measurement values a in the diagram were obtained in the case where the inner surface of the tubular member 10 was polished as described above. The diagram also shows measurement values b obtained in the case where the inner surface of the tubular member 10 was unpolished for comparison.

The residual stress in the case where the inner surface was unpolished, indicated by the measurement values b in FIG. 8, took a positive value at the inner surface of the tubular member 10 and decreased with the distance from the inner surface to be saturated to a substantially constant negative value. This shows that residual stress is tensile stress at the inner surface while changing to compressive stress at a certain distance from the inner surface.

On the other hand, the residual stress in the case where the inner surface is polished, indicated by the measurement values a in FIG. 8, took a negative value on the inner surface of the tubular member 10. The absolute value of the residual stress was greater than that in the case where the inner surface was unpolished, indicated by the measurement values b. The absolute value decreased with the distance from the inner surface, and the residual stress was saturated to a substantially constant negative value. This shows that the absolute value of the residual stress in the inner surface is greater than that in the case where the inner surface is unpolished and also shows that the residual stress is compressive stress, regardless of the distance from the inner surface.

As described above, polishing the inner surface of the tubular member 10 gives compressive residual stress to the inner surface properly.

The compressive residual stress is given by polishing of the inner surface of the tubular member as described above simultaneously while the roughness is reduced by polishing of the inner surface of the tubular member 10. The number of steps to process the tubular member 10 therefore does not change, and the work load does not increase.

Table 3 shows the results of repeated bending fatigue tests for hollow stabilizer bars manufactured by evenly polishing the inner surface of the tubular member. Example 1 is hollow stabilizer bars with the inner surfaces polished according to the embodiment. Comparative Example is hollow stabilizer bars with the inner surface unpolished. The fatigue tests were performed using two samples for each of Example 1 and Comparative Example.

TABLE 3

| | | Number of Bending Cycles to Failure |
|---|---|---|
| Example 1 | No. 1 | 447,546 |
| (Inner Surface was Polished) | No. 2 | 644,988 |
| Comparative Example | No. 1 | 195,857 |
| (Inner Surface was Unpolished) | No. 2 | 173,268 |

Table 3 has confirmed that the number of bending cycles to failure of the hollow stabilizer bars with the inner surfaces evenly polished was increased and the fatigue lives thereof were improved.

Example 2

In Example 2, the method of manufacturing a hollow stabilizer bar of the embodiment was applied, and the inner surface of the tubular member 10 bent into a U-shape (illustrated in FIG. 3) was polished. Measurement of the surface roughness and residual stress was performed for polished and unpolished tubular members. In Example 2, polishing and measurement were carried out under the same conditions as those of Example 1.

Figure 9:
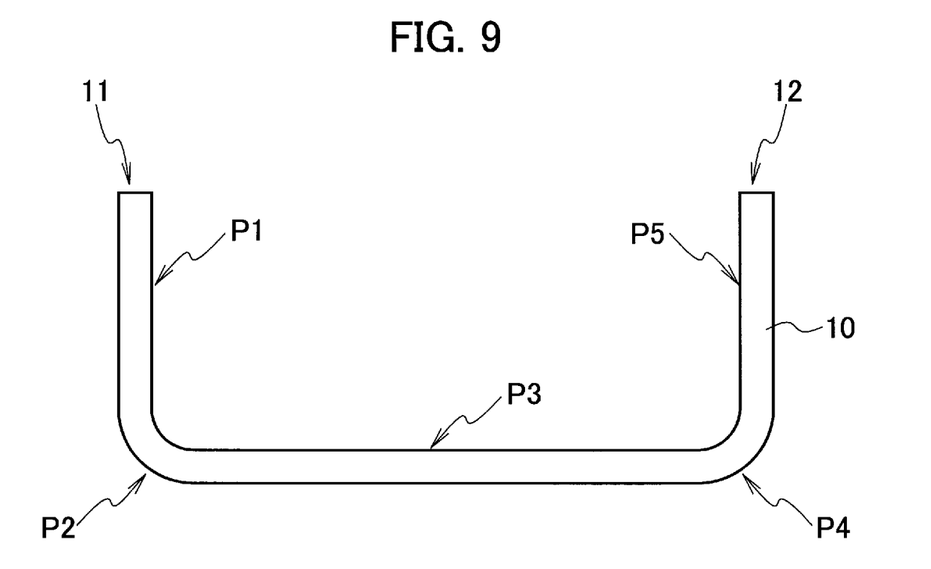
FIG. 9 shows a top view of the tubular member illustrating positions where the surface roughness is measured in Example 2.

FIG. 9 shows the top view of the tubular member 10 illustrating the positions where the surface roughness was measured in Example 2. The measurement of surface roughness was performed at a first position P1 in a straight portion, a second position P2 in a bent portion, a third position P3 in another straight portion, a fourth position P4 in another bent portion, and a fifth position P5 in still another straight portion, in the order starting from the first end 11 of the tubular member 10 toward the second end 12. The first, third, and fifth positions P1, P3, and P5 were at substantially the centers of the respective straight portions in the direction that the tubular member 10 extended.

Figure 10:
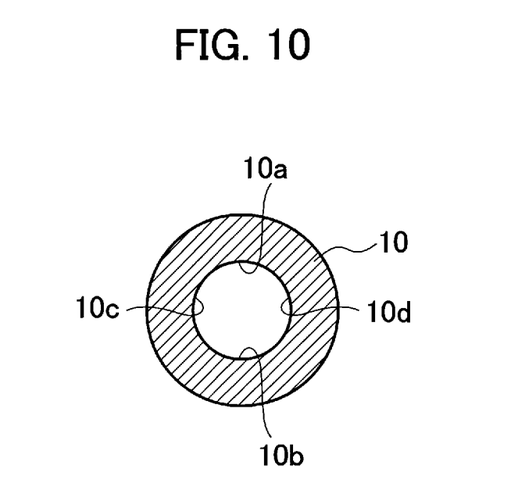
FIG. 10 shows a cross-sectional view of the tubular member illustrating points where the surface roughness is measured in Example 2.

FIG. 10 shows a cross-sectional view of the tubular member 10, illustrating the points where the surface roughness was measured in the inner surface in Example 2. The measurement of surface roughness was performed for polished and unpolished tubular members at four points, including an upper point 10a, a lower point 10b, an inner point 10c, and an outer point 10d at the first to fifth positions P1 to P5 illustrated in FIG. 9. Herein, the inner and outer points 10c and 10d are defined based on the direction that the tubular member 10 is bent at the second and fourth positions P2 and P4 in the bent portions. The inner and outer points at the first, third, and fifth positions P1, P3, and P5 in the straight portions connecting thereto are set in the same direction. At each of the first to fifth positions P1 to P5, the maximum, minimum, and average values of the maximum roughness Rz in the four points, including the upper, lower, inner, and outer points 10a to 10d, were calculated.

Figure 11:
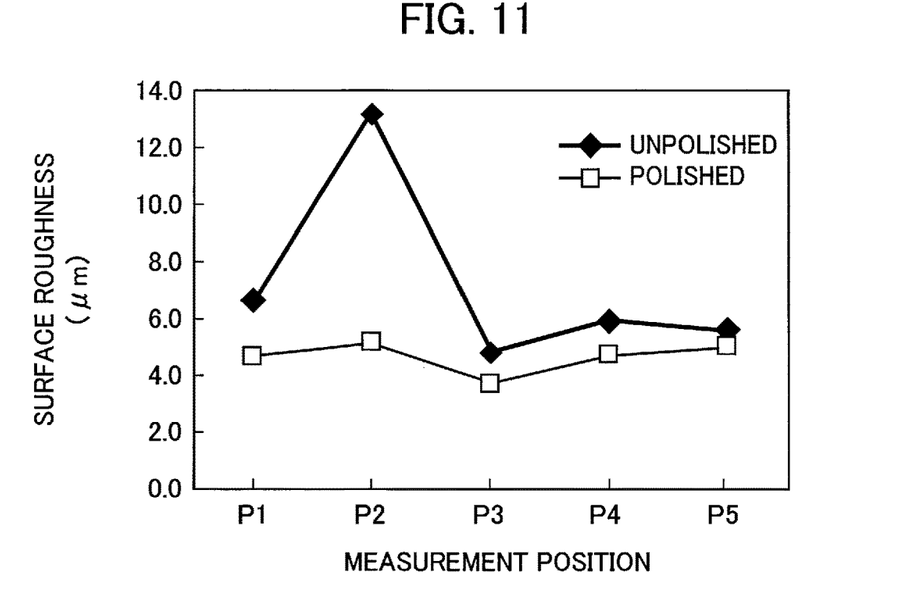
FIG. 11 shows a graph illustrating the average of the results of measuring the surface roughness of Example 2.

FIG. 11 shows a graph illustrating the average of the results of measuring the surface roughness (maximum roughness) of Example 2. A comparison between the polygonal line for the polished tubular member and the polygonal line for the unpolished tubular member shows that the surface roughness decreased at all the first to fifth positions P1 to P5, due to polishing. The average of surface roughness (maximum roughness) exceeded 10 µm at one of the measurement positions of the unpolished tubular member but did not exceed 10 µm at any measurement position of the polished tubular member.

In Example 2, the abrasive medium was flown within the tubular member 10 for polishing. The tubular member 10 was polished evenly with the abrasive medium regardless of the local shape thereof, in either the straight portions corresponding to the first, third, and fifth positions P1, P3, and P5 or the bent portions corresponding to the second and fourth positions P2 and P4. The average of the surface roughness (maximum roughness) decreased across the entire inner surface regardless of the local shape of the tubular member, in either the straight or bent portions.

Figure 12:
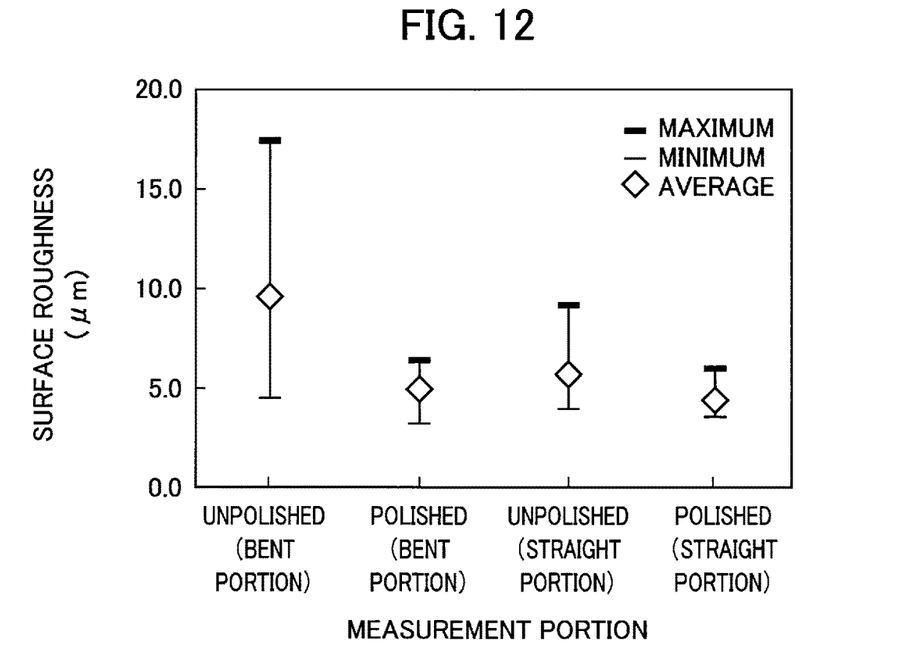
FIG. 12 shows a graph illustrating the results of measuring the surface roughness of Example 2 in relation to the local shape of the tubular member.

FIG. 12 shows a graph illustrating the results of measuring the surface roughness (maximum roughness) of Example 2 in relation to the local shape of the tubular member. A comparison between the polished and unpolished tubular members has revealed that the range from the minimum to maximum value of the maximum roughness was narrowed due to polishing. The range from the minimum to maximum value of the maximum roughness exceeded 10 µm in the bent portion of the unpolished tubular member but did not exceed 10 µm in the polished tubular member regardless of the local shape thereof.

In Example 2, the abrasive medium was flown within the tubular member 10 for polishing. The tubular member 10 was thereby evenly polished with the abrasive medium regardless of the local shape thereof, in either the straight portions corresponding to the first, third, and fifth positions P1, P3, and P5 or the bent portions corresponding to the second and fourth positions P2 and P4. The range from the minimum to maximum value of the maximum roughness was therefore narrow across the entire inner surface regardless of the local shape, in either the straight or bent portions.

Figure 13:
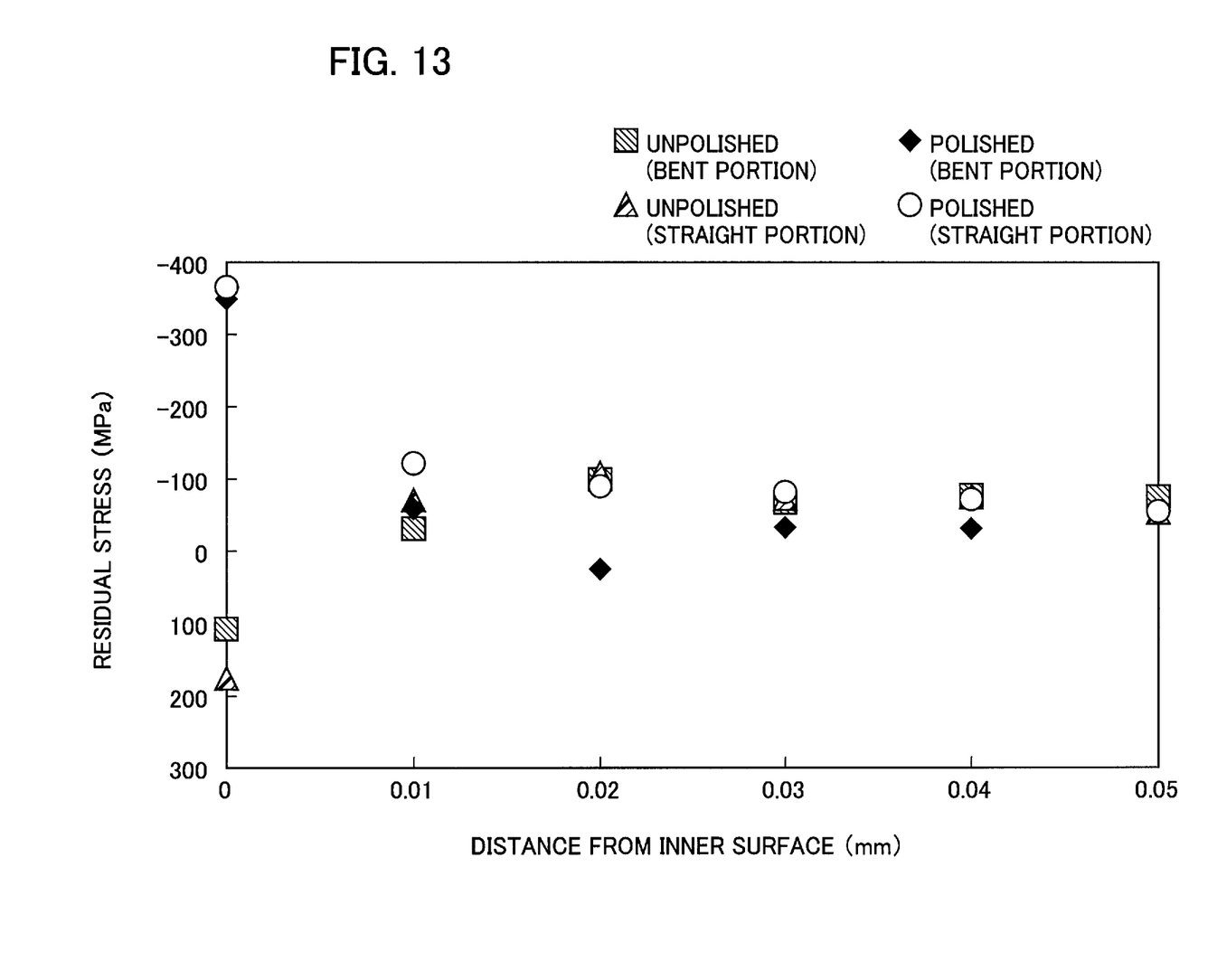
FIG. 13 shows a graph illustrating the results of measuring residual stress of Example 2 in relation to the local shape of the tubular member.

FIG. 13 shows a graph illustrating the results of measuring residual stress in Example 2 in relation to the local shape of the tubular member. In a similar manner to FIG. 12, FIG. 13 illustrates the average of residual stress of the polished and unpolished tubular members in relation to the local shape thereof, including the straight portions corresponding to the first, third, and fifth positions P1, P3, and P5 and the bent portions corresponding to the second and fourth positions P2 and P4. In the polished tubular member, the inner surface was given residual stress regardless of the local shape thereof, in either the straight or bent portions.

In Example 2, the abrasive medium was flown within the tubular member 10 for polishing, and therefore the tubular member 10 was evenly polished in either the straight or bent portions. Compressive residual stress was therefore given to the entire inner surface regardless of the local shape of the tubular member, in either the straight or bent portions.

In Example 2, the abrasive medium was flown within the tubular member 10 to evenly polish the inner surface thereof in a similar manner to Example 1. This reduced the average of the surface roughness to less than 10 µm across the entire inner surface of the tubular member 10 and/or gave compressive residual stress across the entire inner surface. Similarly to Example 1, therefore, the number of bending cycles to failure of the hollow stabilizer bars of Example 2 was increased, and the fatigue life was improved.

INDUSTRIAL APPLICABILITY

The present invention is applicable to a hollow spring used in vehicles, such as automobiles, and a method of manufacturing the same.

DESCRIPTION OF REFERENCE NUMERALS 10 tubular member
11 first end
11a first opening
12 second end
12a second opening
21 first channel
22 second channel
200 abrasive medium

The invention claimed is:

1. A method of manufacturing a hollow spring, comprising the steps of:
   providing a steel tube to be used as a hollow spring, the steel tube being bent into a predetermined shape and heat-treated; and
   after the step of bending and heat treatment, reducing a surface roughness across the entire inner surface of the steel tube so that an average of the surface roughness is less than 10 micrometers across the entire surface of the steel tube and imparting compressive residual stress to the inner surface of the steel tube to increase fatigue life of the hollow spring by polishing the inner surface of the steel tube with a flowing viscoelastic abrasive medium passed within the steel tube between a first opening and a second opening of the steel tube.

2. The method according to claim 1, wherein the polishing step includes a step of flowing the abrasive medium from the first opening of the steel tube toward the second opening.

3. The method according to claim 2, wherein the flowing the abrasive medium further includes supplying the abrasive medium from a supply source to the first opening of the steel tube.

4. The method according to claim 1, wherein the polishing step includes:
   a first step of flowing the abrasive medium from the first opening of the steel tube toward the second opening; and
   a second step of flowing the abrasive medium from the second opening toward the first opening.

5. The method according to claim 4, wherein the first step supplies the abrasive medium from the supply source toward the first opening of the steel tube and collects the abrasive medium from the second opening of the steel tube to the supply source, and the second step supplies the abrasive medium from the supply source to the second opening of the steel tube and collects the abrasive medium from the first opening of the steel tube to the supply source.

6. The method according to claim 1, wherein the abrasive medium includes a viscoelastic base material and a granular abrasive.

7. A hollow spring, that is manufactured by the method according to claim 1.

8. A hollow spring, that is manufactured by the method according to claim 2.

9. A hollow spring, that is manufactured by the method according to claim 3.

10. A hollow spring, that is manufactured by the method according to claim 4.

11. A hollow spring, that is manufactured by the method according to claim 5.

12. A hollow spring, that is manufactured by the method according to claim 6.

\* \* \* \* \*